US011297222B2

(12) United States Patent
Sakai (10) Patent No.: US 11,297,222 B2
(45) Date of Patent: Apr. 5, 2022

(54) IMAGE CAPTURE DEVICE, IMAGE CAPTURE METHOD, AND PROGRAM

(71) Applicant: NEC CORPORATION, Tokyo (JP)

(72) Inventor: Masahito Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/970,516

(22) PCT Filed: Feb. 19, 2019

(86) PCT No.: PCT/JP2019/006014
§ 371 (c)(1),
(2) Date: Aug. 17, 2020

(87) PCT Pub. No.: WO2019/160155
PCT Pub. Date: Aug. 22, 2019

(65) Prior Publication Data
US 2021/0084215 A1  Mar. 18, 2021

(30) Foreign Application Priority Data
Feb. 19, 2018  (JP) ............................. JP2018-027419

(51) Int. Cl.
*H04N 5/232* (2006.01)
*H04N 5/341* (2011.01)
*H04N 5/235* (2006.01)

(52) U.S. Cl.
CPC ..... *H04N 5/23216* (2013.01); *H04N 5/23222* (2013.01); *H04N 5/341* (2013.01); *H04N 5/2353* (2013.01)

(58) Field of Classification Search
CPC .. H04N 5/23216; H04N 5/34; H04N 5/23222; H04N 5/2353; H04N 5/341
See application file for complete search history.

(56) References Cited

U.S. PATENT DOCUMENTS 6,654,062 B1 * 11/2003 Numata ................. H04N 5/235
  348/218.1
2015/0254488 A1 * 9/2015 Naito .................. G06K 7/10851
  235/454

FOREIGN PATENT DOCUMENTS

JP   2011-244298 A   12/2011
JP   2014-132374 A    7/2014
JP   2016-220056 A   12/2016

OTHER PUBLICATIONS

International Search Report for PCT/JP2019/006014 dated Apr. 23, 2019 (PCT/ISA/210).

* cited by examiner

*Primary Examiner* — Ahmed A Berhan (57) ABSTRACT

An image capture device includes: an image capture parameter determination unit configured to determine an exposure time when an image of a display device on which a display character is formed by a plurality of segment light emitters that flash on and off asynchronously at predetermined intervals is captured; a captured image acquisition unit configured to, in accordance with a number of captured images and image capture interval determined on the basis of the exposure time and a formation required period that is required for the display device to form the display character by sequentially turning on any one of the plurality of segment light emitters, acquire the determined number of captured images generated by capturing the image of the display device; and a composition unit configured to generate a composite image obtained by compositing the determined number of captured images.

9 Claims, 7 Drawing Sheets

IMAGE CAPTURE DEVICE, IMAGE CAPTURE METHOD, AND PROGRAM

CROSS REFERENCE TO RELATED APPLICATIONS

This application is a National Stage of International Application No. PCT/JP2019/006014 filed Feb. 19, 2019, claiming priority based on Japanese Patent Application No. 2018-027419, filed Feb. 19, 2018 the disclosures of which are incorporated herein in their entirety.

TECHNICAL FIELD

The present invention relates to an image capture device, an image capture method, and a program.

BACKGROUND ART

Display devices using 7-segment LEDs (Light Emitting Diodes) (segment light emitters) are often used for displaying the amount of money in vending machines and the amount of money in stores. The display device controls the dynamic lighting of the 7-segment LED to form numerical characters such as an amount of money. When the image of the display device using such segment LEDs is captured by an image capture device, a plurality of segment LEDs provided in one unit of the segment LED forming one character are asynchronously lit on the display device, and thus the following problem may occur. For example, within the exposure time of the image capture by the image capture device, all the segment LEDs to be lit by the display device to form characters do not emit light at the same time. For this reason, the characters in the image generated by the image capture often do not represent the characters to be formed by the display device. Patent Document 1 discloses a related technology, which is a technology of a moving image apparatus capable of capturing an image of a dynamically illuminated object such as a flashlight.

CITATION LIST

Patent Literature

[Patent Document 1] Japanese Unexamined Patent Application First Publication No. 2011-244298

SUMMARY OF THE INVENTION

Problems to be Solved by the Invention

Incidentally, when an image of a display device that displays and forms characters by controlling the dynamic lighting of the segment LED as described is captured, it is desired to have an image capture device that captures an image that accurately represents characters formed by the display device.

Therefore, an exemplary object of the present invention is to provide an image capture device, an image capture method, and a program that can solve the above-described problems.

Means for Solving the Problems

According to a first exemplary aspect of the present invention, an image capture device includes: an image capture parameter determination unit configured to determine an exposure time when an image of a display device on which a display character is formed by a plurality of segment light emitters that flash on and off asynchronously at predetermined intervals is captured; a captured image acquisition unit configured to, in accordance with a number of captured images and image capture interval determined on the basis of the exposure time and a formation required period that is required for the display device to form the display character by sequentially turning on any one of the plurality of segment light emitters, acquire the determined number of captured images generated by capturing the image of the display device; and a composition unit configured to generate a composite image obtained by compositing the determined number of captured images.

According to a second exemplary aspect of the present invention, an image capture method includes: determining an exposure time when an image of a display device on which a display character is formed by a plurality of segment light emitters that flash on and off asynchronously at predetermined intervals is captured; acquiring, in accordance with a number of captured images and image capture interval determined on the basis of a formation required period that is required for the display device to form the display character by sequentially turning on any one of the plurality of segment light emitters, and the exposure time, the determined number of captured images generated by capturing the image of the display device; and generating a composite image obtained by compositing the determined number of captured images.

According to the third exemplary aspect of the present invention, a program causes a computer of an image capture device to execute processes, the processes includes: determining an exposure time when an image of a display device on which a display character is formed by a plurality of segment light emitters that flash on and off asynchronously at predetermined intervals is captured; acquiring, in accordance with a number of captured images and image capture interval determined on the basis of the exposure time and a formation required period that is required for the display device to form the display character by sequentially turning on any one of the plurality of segment light emitters, the determined number of captured images generated by capturing the image of the display device; and generating a composite image obtained by compositing the determined number of captured images.

Advantageous Effects of Invention

According to the present invention, it is possible to provide an image capture device that captures an image that more accurately represents characters formed by a display device, when an image of a display device that displays and forms characters by controlling the dynamic lighting of the segment LED is captured.

DESCRIPTION OF EMBODIMENTS

Hereinafter, an image capture device, an image capture method, and a program according to an exemplary embodiment of the present invention will be described with reference to the drawings.

Figure 1:
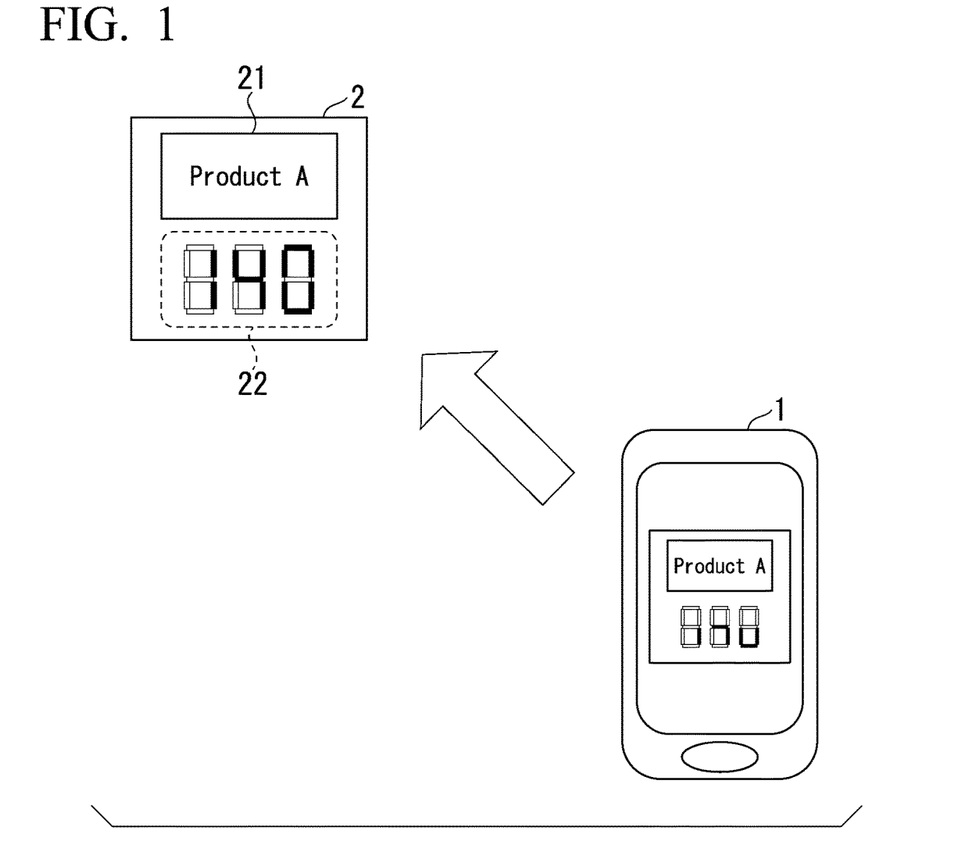
FIG. 1 is a diagram showing an example of an image capture device and a display device according to an exemplary embodiment of the present invention.

FIG. 1 is a diagram showing an example of an image capture device and a display device according to the present exemplary embodiment.

The image capture device 1 is a mobile terminal as an example. The image capture device 1 captures an image of the display device 2 using a function of a camera provided therein. The display device 2 has a product information display area 21 and a fee display area 22. The display device 2 displays product information such as a product name on a liquid crystal display or the like provided in the product information display area 21. The display device 2 turns on a 7-segment LED in the fee display area 22 to form a number and display the fee.

Specifically, three 7-segment LEDs provided in the fee display area 22 of the display device 2 are arranged side by side. By arranging three 7-segment LEDs side by side, the display device 2 can display a three-digit fee as an example. For example, one 7-segment LED forms one number. Each 7-segment LED includes seven segment light emitters that flash on and off asynchronously at predetermined intervals. When a number is formed on one 7-segment LED, the display device 2 forms one number by sequentially lighting the segment light emitters at positions corresponding to the shape of the number at predetermined intervals. The display device 2 is provided for example in a vending machine for displaying a price of a product sold by the vending machine. Alternatively, the display device 2 may be provided on a product shelf of a store and display the price of the product. The display device 2 may be any device that forms display characters using a plurality of segment light emitters such as a 7-segment LED, and performs dynamic lighting control of the LED. The characters displayed by the light emission of the plurality of segment light emitters are not limited to numbers. For example, the characters may be an alphabet or the like.

Hereinafter, a plurality of elements constituting the 7-segment LED will be simply referred to as a segment light-emitting body or a segment LED.

Figure 2:
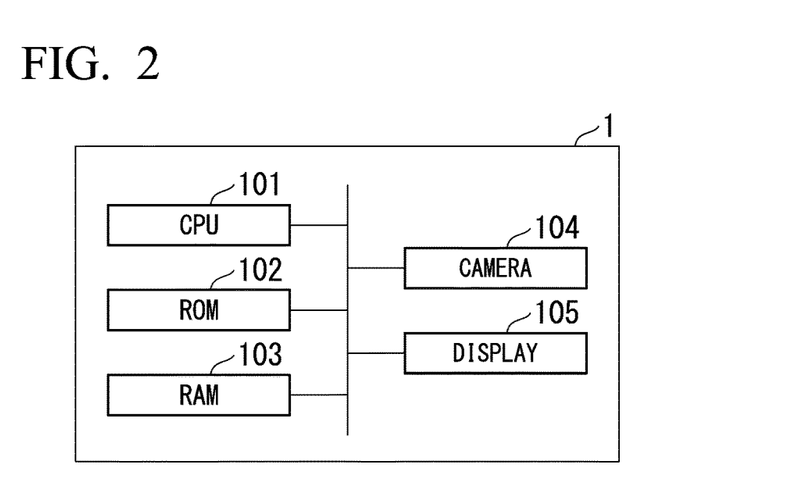
FIG. 2 is a diagram showing a hardware configuration of an image capture device according to an exemplary embodiment of the present invention.

FIG. 2 is a diagram showing a hardware configuration of the image capture device.

As shown in FIG. 2, the image capture device 1 includes hardware such as a CPU (Central Processing Unit) 101, a ROM (Read Only Memory) 102, a RAM (Random Access Memory) 103, a camera 104, a display 105, and the like.

The user captures the image of the display device 2 using the image capture device 1. The image capture device 1 sequentially displays images captured in accordance with an exposure time t, on the display 105. Alternatively, the image capture device 1 records, in the storage unit, an image generated at the timing when the user performs an operation of releasing the shutter, among images captured according to the exposure time t. The exposure time t of the image capture device 1 is generally shorter than a formation required period T that is required for the display device 2 to sequentially turn on any one of the plurality of segment LEDs constituting the 7-segment LED to form a display character. That is, the exposure time t is shorter than a total time (formation required period T) for when a plurality of segment light emitters are sequentially turned on to form display characters. In this case, the image generated by the image capture device 1 in response to the timing at which the user performs the operation of releasing the shutter is, for example, an image of the display device 2 in a state where all the segment LEDs for forming the display characters are not lit. For this reason, there are many cases where a state in which characters such as numbers to be displayed by the image capture device 1 are not accurately represented, is displayed as an image generated by the image capture device 1.

The image capture device 1 according to the present exemplary embodiment is provided with a function for generating an image that correctly displays characters such as numbers to be displayed by the display apparatus 2, even when the image capture device 1 captures an image of the display apparatus 2 described above. That is, in the image capture device 1 according to the present exemplary embodiment, when an image is generated by capturing the image of the display device 2 in which characters are represented by a plurality of segment light emitters being dynamically lit, it is possible to generate images in which the characters are appropriately displayed.

Figure 3:
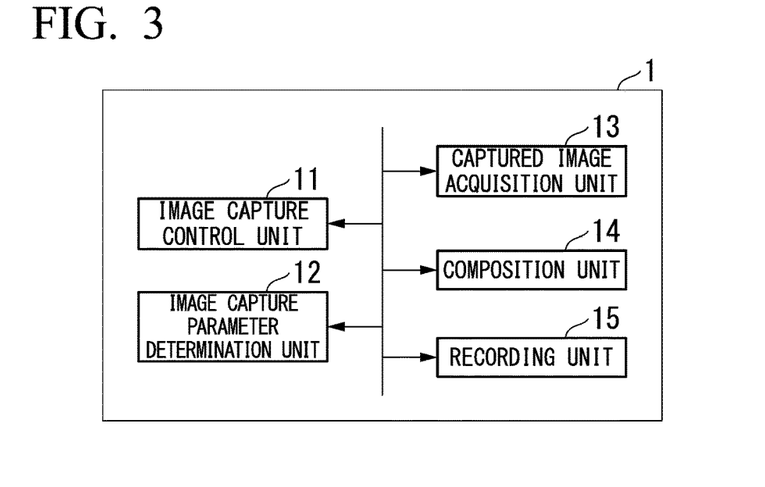
FIG. 3 is a functional block diagram of an image capture device according to an exemplary embodiment of the present invention.

FIG. 3 is a functional block diagram of the image capture device.

The image capture device 1 executes an image capture control program when the power is turned on. Thereupon, the image capture device 1 includes the functions of an image capture control unit 11, an image capture parameter determination unit 12, a captured image acquisition unit 13, a composition unit 14, and a recording unit 15. The image capture device 1 may have other functions. For convenience of description, the description of the other processing units of the image capture device 1 will be omitted. The image capture control program is stored in, for example, the ROM 102 and the RAM 103 described above with reference to FIG. 2

Figure 4:
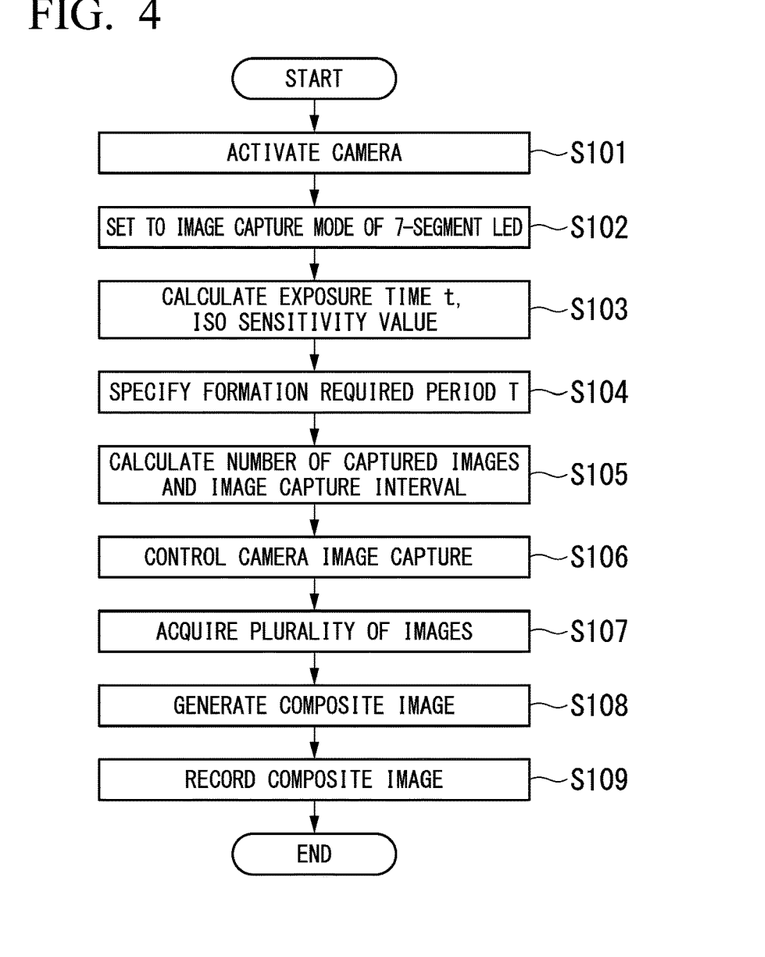
FIG. 4 is a diagram showing a processing flow of an image capture device according to an exemplary embodiment of the present invention.

FIG. 4 is a diagram showing a processing flow of the image capture device.

Next, the processing flow of the image capture device 1 will be described step by step.

When the user causes the image capture device 1 to capture an image of the display device 2 having the 7-segment LED, the user performs an operation of activating the camera 104 provided in the image capture device 1. Thereby the camera 104 is activated (step S101). The camera 104 receives the light incident from the lens by the image sensor, and displays an image generated on the basis of the received light on the display 105 of the image capture device 1. That is, the display 105 functions as a liquid crystal viewfinder of the camera 104. At this time, the image capture control unit 11 performs focusing control on the basis of the image generated by the camera 104.

The user sets the image capture mode of the image capture device 1 to the image capture mode of the 7-segment LED (step S102). The image capture control unit 11 instructs the image capture parameter determination unit 12 to determine image capture parameters in the image capture mode of the 7-segment LED. That is, the image capture control unit 11 instructs the image capture parameter determination unit 12 to determine the image capture parameters used in the image capture mode of the 7-segment LED. Then the image capture parameter determination unit 12 starts a process of determining image capture parameters in the image capture mode of the 7-segment LED.

The image capture parameter determination unit 12 calculates an exposure time t, which is a shutter speed, an ISO sensitivity value, and the like, on the basis of information such as the brightness of an image generated by the camera 104 (step S103). For the calculation of the exposure time t and the ISO sensitivity value, a calculation method performed by known image capture parameter automatic setting control may be used.

The image capture parameter determination unit 12 also specifies a formation required period T required for the display device 2 to sequentially turn on each segment light emitter of the 7-segment LED to form a display character (step S104).

The formation required period T may be determined in advance, or may be a formation required period T selected by the user from a plurality of formation required periods T of different lengths. The formation required period T determined by the image capture device 1 needs to be a time longer than the period necessary for the display device 2 to actually sequentially turn on each segment light emitter of the 7-segment LED to form a display character. The user may select an appropriate formation required period T according to the display device 2, and the image capture parameter determination unit 12 may acquire information on the formation required period T selected by the user.

Further, the image capture parameter determination unit 12 may recognize code information such as a two-dimensional code displayed on the display device 2 based on an image obtained from the camera 104, and specify a formation required period T included in the code information as the formation required period T used in the image capture by the own device. Moreover, the image capture parameter determination unit 12 may receive the information of the formation required period T transmitted by the display device 2 using a wireless communication function, and specify the received formation required period T as the formation required period T used in the image capture by the own device. The image capture parameter determination unit 12 also recognizes identification information such as the ID of the display device 2 that appears in the image captured by the camera 104, and specifies the formation required period T stored in advance in association with the identification information, as the formation required period T used in the image capture by the own device.

The image capture parameter determination unit 12 may specify the exposure time t according to the specified formation required period T. For example, the image capture device 1 may specify a value obtained by dividing the formation required period T by n, as the exposure time t. For example, the image capture device 1 stores in advance, a plurality of exposure times t1, t2, . . . tm, such as a plurality of exposure times t1 for when the formation required period T is divided by "n1", and a plurality of exposure times t2 for when the formation required period T is divided by "n2". The image capture parameter determination unit 12 may select any of the exposure times t1, t2, . . . tm closest to the exposure time t specified by the image capture parameter automatic setting control, and specify the exposure time t. The exposure time t specified by the image capture parameter automatic setting control is, for example, an exposure time according to the brightness of the display device 2. That is, the image capture parameter determination unit 12 specifies as the exposure time t, the time closest to the exposure time specified by the image capture parameter automatic setting control among the plurality of exposure time candidates (t1, t2, . . . tm).

Moreover, the image capture parameter determination unit 12 calculates the number of captured images and the image capture interval, using the specified formation required period T and the exposure time t (step S105). Specifically, the image capture parameter determination unit 12 calculates the value of the expression "formation required period T/exposure time t" as the number of captured images. Further, the image capture parameter determination unit 12 calculates the value of the expression "formation required period T+exposure time t" as the image capture interval.

Figure 5:
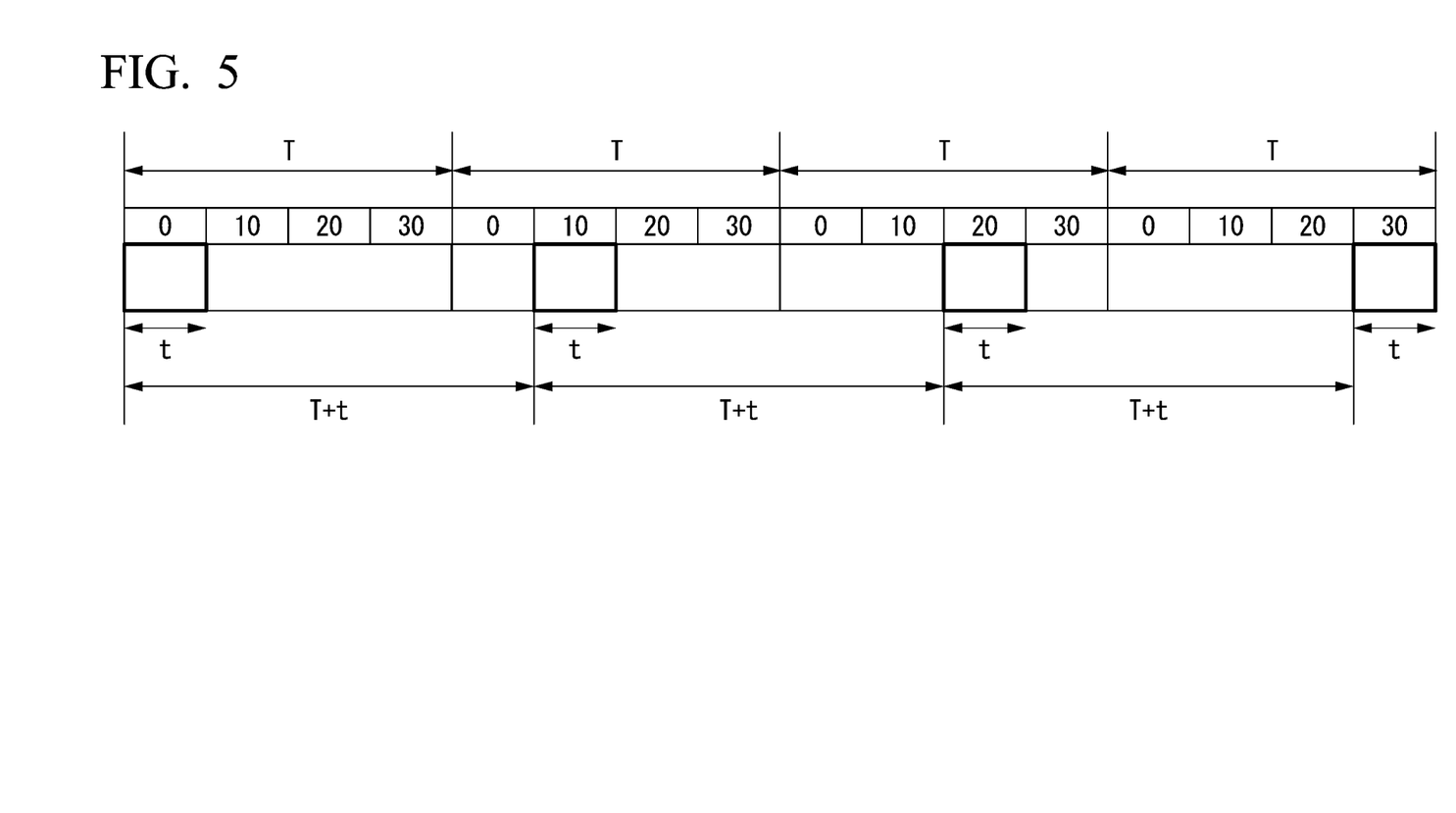
FIG. 5 is a first diagram showing the number of captured images and the image capture interval according to an exemplary embodiment of the present invention.

FIG. 5 is a first diagram showing the number of captured images and the image capture interval.

FIG. 5 is a diagram showing the number of captured images and the image capture interval determined by the formation required period T and the exposure time t obtained by dividing the formation required period T by "n=4". In FIG. 5, it is assumed that the formation required period T is 40 milliseconds. It is assumed that the exposure time t is 10 milliseconds based on the expression "40 milliseconds/4". In this case, the image capture parameter determination unit 12 calculates the number of captured images "4 (=40/10)". Moreover, the image capture parameter determination unit 12 calculates an image capture interval "50 (=40+10) milliseconds".

The image capture device 1 uses these image capture parameters and performs shutter release control of the number of captured images "4" at 50-millisecond intervals. This makes it possible to generate an image generated by exposure at all timings obtained by dividing the formation required period T into four. That is, by image capture at intervals of 50-millisecond, the image of the display device 2 can be captured at each timing obtained by dividing the formation required period T "40 seconds" into four. According to the example of FIG. 5, the image of the display device 2 can be captured at the start of the formation required period T, 10 seconds after the start, 20 seconds after the start, and 30 seconds after the start. The image capture device 1 starts image capture for each image capture interval after a lapse of a different period from the start of the formation required period T. That is, the image capture timing in the formation required period T can be made different for each image capture time. This makes it possible to generate a plurality of images in a state where each of the segment light emitters having different light emission timings emit light.

In this way, the image capture device 1 sets the number of captured images and the image capture interval on the basis of the formation required period T and the exposure time t. The image capture device 1 performs image capture according to the exposure time t, the number of captured images, and the image capture interval. Thereby, it is possible to generate a plurality of images in a state where different segment light emitters emit light.

In FIG. 5, for convenience of explanation, a description is given using an example in which the exposure time t is obtained by dividing the formation required period T into four. However, in the case where the display device 2 uses a 7-segment LED, then after the state in which all segments are turned off, the display device 2 sequentially turns on the 7 segment light emitters at eight timings of t0, t1, t7 to form characters. Therefore, it is assumed that the image capture device 1 can determine the exposure time t on the basis of the lighting timing of the segment light emitter, such as the exposure time t being a time obtained by dividing the formation required period T into eight. As a result, the image capture device 1 generates an image at each light emission timing of the segment light emitters (LEDs) constituting all the segment LEDs.

In other words, when a 7-segment LED is used, for example, a time obtained by dividing the formation required period T into eight may be set as the exposure time t. In this case, the image capture device 1 captures the image of the display device 2 at eight timings different in elapsed time in the formation required period T for each image capture interval. That is, the image capture device 1 captures an image of the display device 2 at each light emission timing of the 7-segment light emitters. In this manner, a value obtained by dividing the formation required period T according to the number of segment LEDs forming one character may be set as the exposure time t.

The image capture parameter determination unit 12 outputs image capture parameters such as an ISO sensitivity value, an exposure time t, a formation required period T, a number of captured images, and an image capture interval to the image capture control unit 11. The image capture control unit 11 uses the image capture parameters such as the ISO sensitivity value, the exposure time t, the formation required period T, the number of captured images, and the image capture interval input from the image capture parameter determination unit 12 to control the camera 104 that captures the image of the subject display device 2 at the start of the operation of releasing the shutter based on the user operation (step S106). The camera 104 captures an image of the display device 2 on the basis of the image capture parameters according to the control. Thereby, the camera 104 performs image capture for the number of captured images at each image capture interval, and generates a plurality of images. The captured image acquisition unit 13 acquires a plurality of images generated by the camera 104 (Step S107). The captured image acquisition unit 13 outputs the acquired captured images to the composition unit 14.

Figure 6:
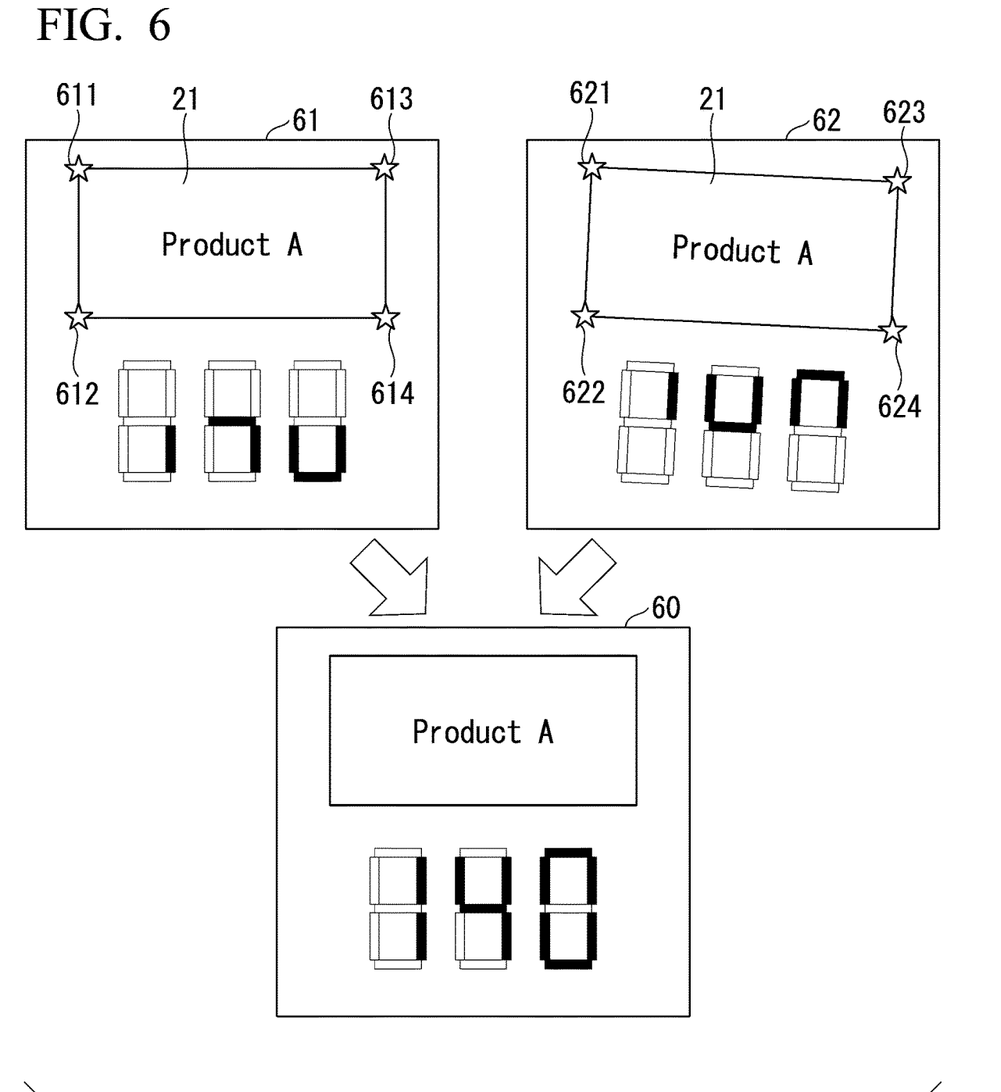
FIG. 6 is a diagram showing a plurality of images generated at different timings by an image capture device 1, according to an exemplary embodiment of the present invention.

FIG. 6 is a diagram showing a plurality of images generated at different timings by the image capture device 1.

The two images shown in FIG. 6 show as examples, two images of a plurality of images generated by image capture in the formation required period T described above with reference to FIG. 5. For example, the upper left diagram in FIG. 6 shows a first image 61 generated by image capture at the timing of the first exposure time t1 in the formation required period T. Moreover, the upper right diagram in FIG. 6 shows a second image 62 generated by image capture at the timing of the second exposure time t2 in the formation required period T.

The exposure time t in the example of FIG. 6 is longer than a time obtained by dividing the formation required period T into eight. Therefore, in the example of the first image 61 and the second image 62, not only one segment LED but also a plurality of segment LEDs emit light.

Due to camera shake or the like when a user performs an image capture operation using the image capture device 1, each image generated by image capture in the formation required period T may have a different position for the same corresponding feature point. As shown in FIG. 6, the position of the 7-segment LED in the image may be different between the first image 61 and the second image 62.

The composition unit 14 of the image capture device 1 detects a plurality of corresponding feature points in each image input from the captured image acquisition unit 13. The composition unit 14 detects a position (for example, a coordinate) of a feature point in each of the plurality of images.

As an example, the composition unit 14 detects the in-image coordinates 611 and 612 of the upper left and lower left vertices of the rectangle formed by the product information display area 21 displayed in the first image 61, and the in-image coordinates 613 and 614 of the upper right and lower right vertices. Moreover, the composition unit 14 detects the in-image coordinates 621 and 622 of the upper left and lower left vertices of the rectangle formed by the product information display area 21 displayed in the second image 62, and the in-image coordinates 623 and 624 of the upper right and lower right vertices. Similarly, the composition unit 14 detects the in-image coordinates of the corresponding feature points for each of the acquired images.

Then, the composition unit 14 generates a composite image in which the corresponding feature points are combined (Step S108). The composition unit 14 combines the plurality of images by, for example, matching the coordinates of the feature points in each of the plurality of images. In generation of the composite image, the composition unit 14 matches the corresponding feature points detected for each of the acquired images, and selects from the pixels the pixel having the highest luminance among the corresponding pixels of each captured image. The composition unit 14 generates a composite image using the selected pixels. That is, the composition unit 14, when the positions of the feature points of the plurality of images are matched, adopts a pixel value of a pixel having higher luminance among a plurality of corresponding pixels of the plurality of images, as a pixel value of the composite image. As a result, one image in which pixels with high luminance are selected from the respective images is generated. The recording unit 15 records the composite image in a memory or the like (Step S109). The composition unit 14 may output the composite image to the display 105.

By the processing of the composition unit 14 described above, an image of combined images captured in the state where any one of the segment LEDs among the plurality of segment LEDs emits light in each divided period, is generated using the image of each period equal to the exposure time t set by dividing up the formation required period T. Therefore, the image capture device 1 as described above can generate a high-quality image free from defocus, which is an image that correctly represents characters such as numbers that the display device 2 intends to display using the segment LEDs.

Moreover, according to the above-described processing, the image capture device 1 captures an image of the display apparatus 2 on the basis of the ISO sensitivity value and the exposure time t according to the brightness environment at the time of capturing the image of the display apparatus 2. For this reason, in addition to the above-mentioned effects, it is possible to generate a high-quality image in which the brightness of the image is appropriate.

Figure 7:
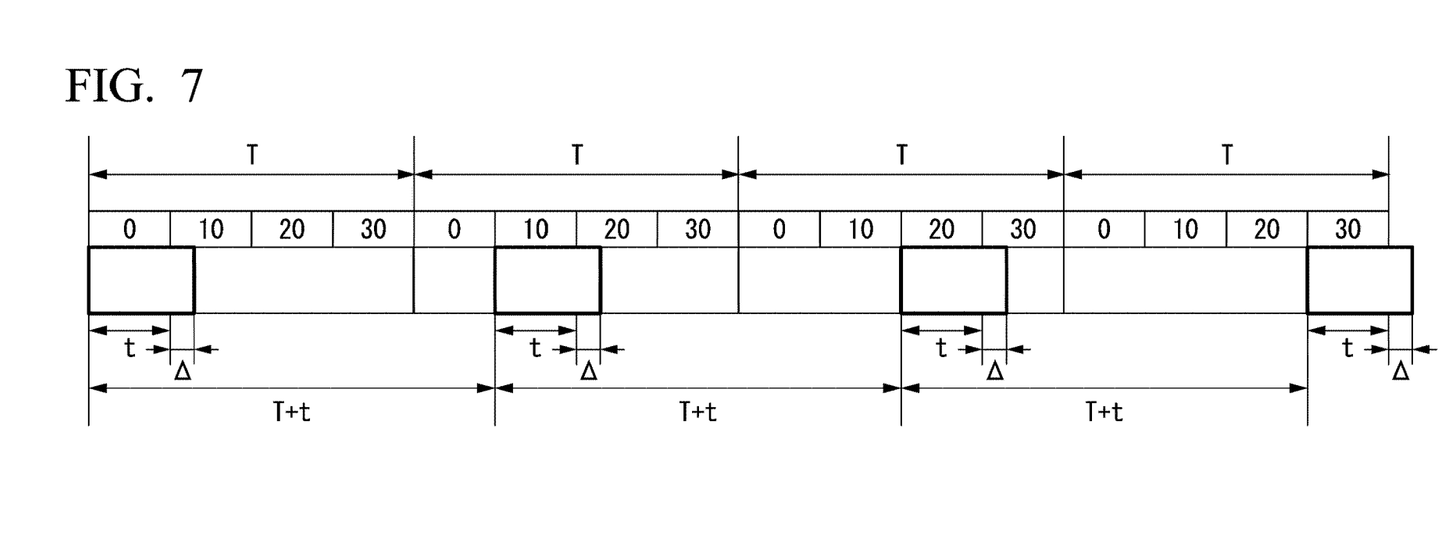
FIG. 7 is a second diagram showing the number of captured images and the image capture interval according to an exemplary embodiment of the present invention.

FIG. 7 is a second diagram showing the number of captured images and the image capture interval.

FIG. 7 shows an example in which the exposure time t is longer by a time Δ than in FIG. 5. In this way, the image capture parameter determination unit 12 may determine an exposure time t+Δ obtained by adding the time Δ shorter than the exposure time t to the exposure time t, as the new exposure time t. As a result, the periods of the exposure times of the images used by the composition unit 14 overlap, and a composite image can be generated in which the exposure time does not deviate the emission timing of the segment LED. That is, by lengthening the exposure time t, the exposure periods in the respective formation required periods T overlap in a plurality of image capture times. Therefore, it is possible to more reliably capture an image of the state in which each segment LED emits light. By combining the images generated in this way, it is possible to generate a composite image in which characters are appropriately formed.

Figure 8:
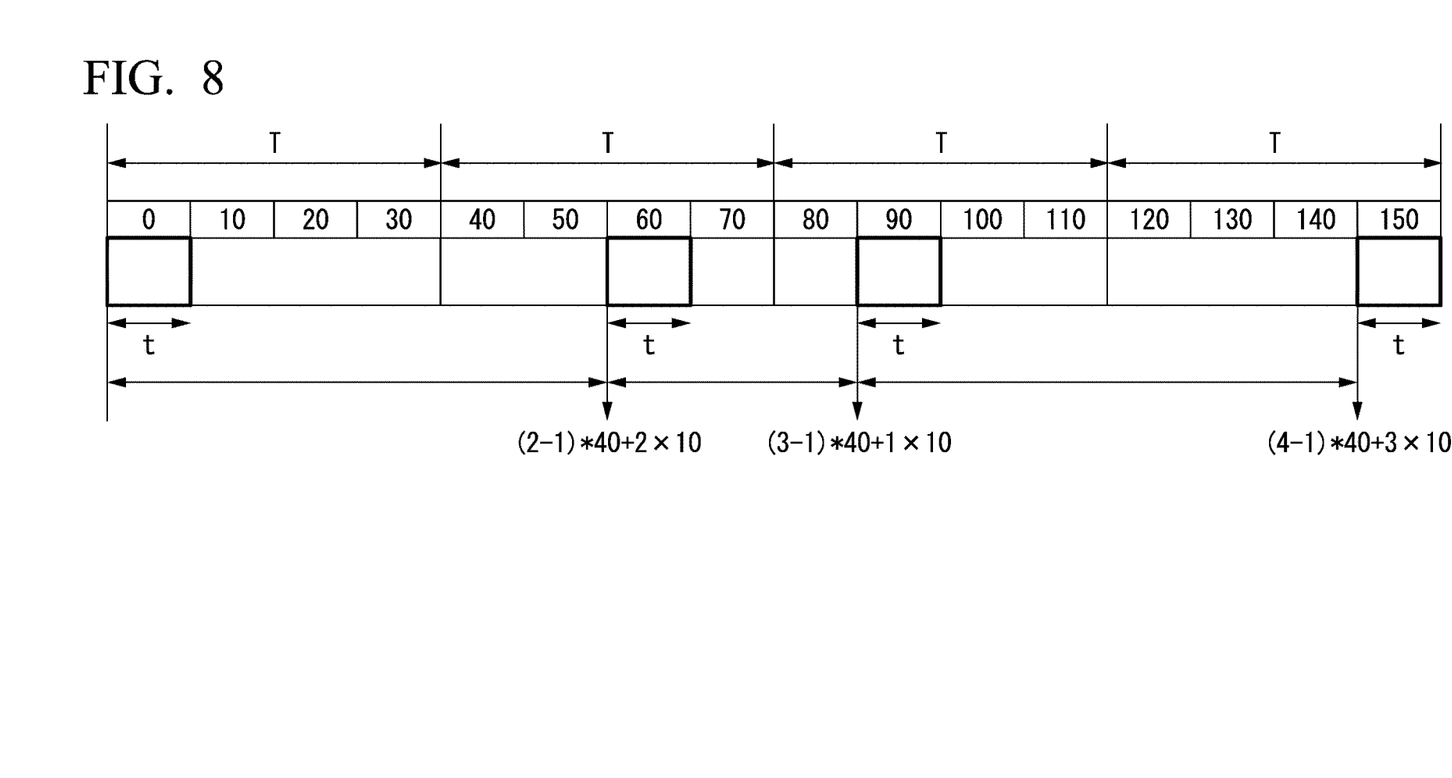
FIG. 8 is a third diagram showing the number of captured images and the image capture interval according to an exemplary embodiment of the present invention.

FIG. 8 is a third diagram showing the number of captured images and the image capture interval.

In FIG. 5 an example was described in which the image capture interval is a fixed period according to the formula "formation required period T+exposure time t". However, as shown in FIG. 8, the image capture interval may be random instead of constant. For example, a case where the number of captured images is K and the first image capture start time is 0 millisecond is illustrated. In this case, when the second time is set to "k=1", the image capture start time of the kth time (k=1, 2, . . . , K−1) after the second time may be calculated by the equation "k×T+i×t". Here, the variable k is "k=1, . . . , K−1", and the variable i is a value randomly selected only once from {1, 2, . . . , K−1}.

In FIG. 8, assuming that the start time of the first exposure time t (=image capture start time) is 0 millisecond, the image capture parameter determination unit 12 calculates the time "60 (=1×40+2×10) milliseconds". Further, the image capture parameter determination unit 12 calculates a time "90 (=2×40+1×10) milliseconds" as the third (=k)-th image capture start time. Moreover, the image capture parameter determination unit 12 calculates a time "150 (=3×40+3×10) milliseconds" as the fourth (=k)-th image capture start time.

As described above, the image capture parameter determination unit 12 calculates the start time so that the image capture start time in the formation required period T is random among a plurality of image capture times. As a result, as shown in FIG. 8, the image capture parameter determination unit 12 can not only vary the image capture timing in the formation required period T for each image capture, but also randomly set the image capture timing for each image capture.

In this way, the image capture parameter determination unit 12 calculates the start time such that the image capture start time in the formation required period T becomes random among a plurality of image capture times. As a result, as shown in FIG. 8, the image capture parameter determination unit 12 can not only make the image capture timing different in the formation required period T for each image capture time, but also set the image capture timing for each image capture time randomly.

In other words, the timing at which the state in which the predetermined segment LED emits light is captured (that is, the elapsed time in the formation required period T) can be made different between the plurality of composite images. Thus, for example, when a problem occurs in a predetermined segment LED at a predetermined interval, the probability that an appropriate composite image can be generated can be improved.

The exposure time t setting process described in FIG. 7 and the exposure timing (image capture start time) calculation process described in FIG. 8 may be applied individually or in combination. By combining the processes, an effect obtained by combining the effects of the respective processes is achieved.

Figure 9:
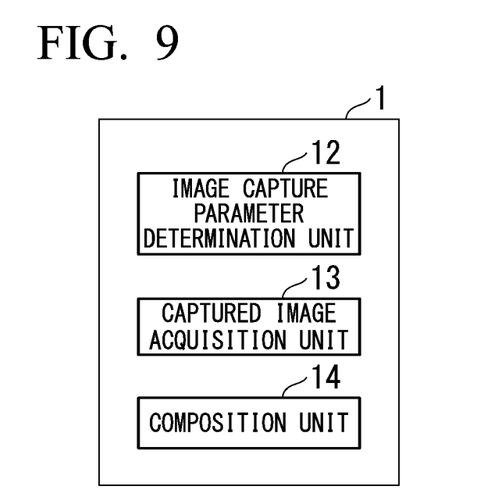
FIG. 9 is a diagram showing a minimum configuration of an image capture device according to an exemplary embodiment of the present invention.

FIG. 9 is a diagram showing the minimum configuration of the image capture device.

The image capture device 1 only needs to include at least the above described image capture parameter determination unit 12, the captured image acquisition unit 13, and the composition unit 14.

The image capture device 1 described above may be a computer including hardware such as a CPU, a ROM, a RAM, a camera, and a display.

The above-described image capture device 1 has a computer system inside. The processes of the above-described processes are stored in a computer-readable recording medium in the form of a program, and the above-described processes are performed by reading and executing the program by the computer. Here, the computer-readable recording medium refers to a magnetic disk, a magneto-optical disk, a CD-ROM, a DVD-ROM, a semiconductor memory, or the like. Alternatively, the computer program may be distributed to a computer via a communication line, and the computer that has received the distribution may execute the program.

Moreover, the above program may be for realizing some of the functions described above.

Further, it may be a so-called difference file (difference program) that can realize the above-mentioned functions in combination with a program already recorded in the computer system.

INDUSTRIAL APPLICABILITY

According to the present invention, it is possible to provide an image capture device that captures an image that more accurately represents characters formed by a display device, when an image of a display device that displays and forms characters by controlling the dynamic lighting of the segment LED is captured.

REFERENCE SIGNS LIST

1 Image capture device
2 Display device
11 Image capture control unit
12 Image capture parameter determination unit
13 Captured image acquisition unit
14 Composition unit
15 Recording unit
101 CPU
102 ROM
103 RAM
104 Camera
105 Display

The invention claimed is:

1. An image capture device including:
at least one memory configured to store instructions; and
at least one processor configured to execute the instructions to:
determine an exposure time when an image of a display device on which a display character is formed by a plurality of segment light emitters that flash on and off asynchronously at predetermined intervals is captured;

acquire, in accordance with a number of captured images and image capture interval determined on the basis of the exposure time and a formation required period that is required for the display device to form the display character by sequentially turning on any one of the plurality of segment light emitters, the determined number of captured images generated by capturing the image of the display device; and generate a composite image obtained by compositing the determined number of captured images.

2. The image capture device according to claim 1, wherein the at least one processor is configured to execute the instructions to determine respective feature points of the captured images of the number of captured images, and for when the positions of the feature points are matched, generate the composite image using pixels of the highest luminance among a plurality of pixels corresponding to the captured images of the number of captured images.

3. The image capture device according to claim 1, wherein the at least one processor is further configured to execute the instructions to determine a formation required period corresponding to the display device among a plurality of different formation required period candidates.

4. The image capture device according to claim 1, wherein the at least one processor is further configured to execute the instructions to determine, among a plurality of exposure time candidates calculated by respectively dividing the formation required period by a plurality of division values, an exposure time candidate that is close to the exposure time according to the brightness of the display device as the exposure time.

5. The image capture device according to claim 4, wherein the at least one processor is configured to execute the instructions to determine a period in which a predetermined time shorter than an exposure time candidate among the plurality of exposure time candidates, is added to the exposure time candidate that is close to the exposure time according to the brightness of the display device, as the exposure time.

6. The image capture device according to claim 4, wherein the at least one processor is configured to execute the instructions to calculate an image capture start time according to the exposure time in the formation required period so as to be random.

7. The image capture device according to claim 1, wherein the at least one processor is configured to execute the instructions to calculate a value obtained by dividing the formation required period by the exposure time as the number of captured images, and calculate a period obtained by adding the exposure time to the formation required period as the image capture interval.

8. An image capture method comprising:

determining an exposure time when an image of a display device on which a display character is formed by a plurality of segment light emitters that flash on and off asynchronously at predetermined intervals is captured;

acquiring, in accordance with a number of captured images and image capture interval determined on the basis of a formation required period that is required for the display device to form the display character by sequentially turning on any one of the plurality of segment light emitters, and the exposure time, the determined number of captured images generated by capturing the image of the display device; and generating a composite image obtained by compositing the determined number of captured images.

9. A non-transitory computer-readable recording medium storing a program that causes a computer of an image capture device to execute processes, the processes comprising:

determining an exposure time when an image of a display device on which a display character is formed by a plurality of segment light emitters that flash on and off asynchronously at predetermined intervals is captured;

acquiring, in accordance with a number of captured images and image capture interval determined on the basis of the exposure time and a formation required period that is required for the display device to form the display character by sequentially turning on any one of the plurality of segment light emitters, the determined number of captured images generated by capturing the image of the display device; and generating a composite image obtained by compositing the determined number of captured images.

* * * * *